United States Patent
Nakagawa

(10) Patent No.: US 11,632,649 B2
(45) Date of Patent: Apr. 18, 2023

(54) WAITING SITUATION MANAGING DEVICE, WAITING SITUATION MANAGING SYSTEM, WAITING SITUATION MANAGING METHOD, AND PROGRAM

(71) Applicant: NEC Corporation, Tokyo (JP)

(72) Inventor: Jumpei Nakagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/209,673

(22) Filed: Mar. 23, 2021

(65) Prior Publication Data
US 2021/0306795 A1 Sep. 30, 2021

(30) Foreign Application Priority Data
Mar. 27, 2020 (JP) .............................. JP2020-057145

(51) Int. Cl.
*H04W 4/021* (2018.01)

(52) U.S. Cl.
CPC .................................. *H04W 4/021* (2013.01)

(58) Field of Classification Search
CPC ..... H04W 4/021; H04W 4/023; H04W 4/024; H04W 4/025; H04W 4/029; G06Q 10/0631; G06Q 50/30
See application file for complete search history.

(56) References Cited

U.S. PATENT DOCUMENTS

| | | | | |
|---|---|---|---|---|
| 2014/0354429 | A1* | 12/2014 | Henderson | G08B 21/22 340/541 |
| 2015/0296766 | A1* | 10/2015 | Gaskamp | A01M 23/22 43/61 |
| 2019/0137290 | A1* | 5/2019 | Levy | B60Q 1/50 |
| 2019/0139258 | A1* | 5/2019 | Slattery | G06V 20/52 |
| 2019/0228358 | A1* | 7/2019 | Ootsuka | G06Q 10/06312 |
| 2020/0226652 | A1* | 7/2020 | Kama | G06Q 30/0641 |
| 2020/0342239 | A1 | 10/2020 | Kasai et al. | |

FOREIGN PATENT DOCUMENTS

| | | | | |
|---|---|---|---|---|
| JP | H09-153098 A | | 6/1997 | |
| JP | 2019117964 | * | 12/2017 | ............... H04N 7/18 |
| JP | 2019-086888 A | | 6/2019 | |

OTHER PUBLICATIONS

Shinichiro Mori, "Trend of Indoor Positioning Technology for Smartphone and Introduction of New Technology", Information Processing, vol. 53, No. 4, 2012, Japan.

* cited by examiner

*Primary Examiner* — Jean A Gelin

(57) ABSTRACT

A waiting situation of users is more accurately known. A waiting situation managing device 10 according to the present disclosure includes: a position information acquiring unit 11 configured to acquire position information about a person within a monitored area; and a waiting person specifying unit 12 configured to judge a person who stays in a waiting area within the monitored area, as a waiting person, and to further judge a person who stays in a predetermined range from the person judged as the waiting person, as a waiting person. The waiting person specifying unit 12 repeatedly performs the judgement of the waiting person until the person who stays in the predetermined range from the person judged as the waiting person is not found.

8 Claims, 8 Drawing Sheets

WAITING SITUATION MANAGING DEVICE, WAITING SITUATION MANAGING SYSTEM, WAITING SITUATION MANAGING METHOD, AND PROGRAM

INCORPORATION BY REFERENCE

This application is based upon and claims the benefit of priority from Japanese patent application No. 2020-057145, filed on Mar. 27, 2020, the disclosure of which is incorporated herein in its entirety by reference.

TECHNICAL FIELD

The present disclosure relates to a technology for knowing a waiting situation of users for a taxi, a bus or the like.

BACKGROUND ART

For both convenience for users and revenue increase for taxi companies, it is expected to dispatch a taxi to a taxi stand installed in front of a station or the like, depending on a situation in which persons wait for taxis. Further, when there are so many users at a bus stop that all users cannot ride on a single bus at the time of an event such as a concert, it is desirable to dispatch a relief bus.

As a technology for coping with these needs, Japanese Unexamined Patent Application Publication No. 2019-86888 discloses a technology in which a moving body such as a bus and a taxi is provided with a position information acquiring unit configured to acquire position information about the moving body and a moving-body external-information acquiring unit configured to acquire external information and person concentration information indicating concentration of persons is calculated with reference to the position information and external information about the moving body. Further, in this literature, with reference to the calculated person information, a headcount distribution map in which the person concentration information is shown at each position on a map indicated by map information is created.

Japanese Unexamined Patent Application Publication No. 9-153098 discloses a method of measuring the number of users who wait near a stand for a bus, a taxi or the like by analyzing an image photographed by a camera that is installed near the stand, and inputting and managing demand data by repeating demand count at a predetermined time interval.

However, in the above-described technologies, the number of all persons including passers in addition to users near the stand is counted, and therefore, there is a problem in that it is not possible to accurately measure the number of users.

SUMMARY

In view of the above-described problem, an object of the present disclosure is to provide a waiting situation managing device, a waiting situation managing system, a waiting situation managing method and a program that make it possible to more accurately know the waiting situation of users.

A waiting situation managing device according to the present disclosure includes: a position information acquiring unit configured to acquire position information about a person within a monitored area; and a waiting person specifying unit configured to judge a person who stays in a waiting area within the monitored area, as a waiting person, and to further judge a person who stays in a predetermined range from the person judged as the waiting person, as a waiting person.

A waiting situation managing system according to the present disclosure includes: a detection device configured to detect position data that is received from a communication terminal, the detection device being installed within a monitored area, the communication terminal being carried by a person, the position data indicating a current position of the person; and a waiting situation managing device configured to include a position information acquiring unit configured to acquire position information about the person within the monitored area, based on the position data, the position information acquiring unit being communicably connected with the detection device, and a waiting person specifying unit configured to judge a person who stays in a waiting area within the monitored area, as a waiting person, and to further judge a person who stays in a predetermined range from the person judged as the waiting person, as a waiting person.

A waiting situation managing method according to the present disclosure includes: acquiring position information about a person within a monitored area; and judging a person who stays in a waiting area within the monitored area, as a waiting person, and further judging a person who stays in a predetermined range from the person judged as the waiting person, as a waiting person.

A non-transitory computer readable medium configured to store a program that causes a computer to execute a process according to the present disclosure includes: acquiring position information about a person within a monitored area; and judging a person who stays in a waiting area within the monitored area, as a waiting person, and further judging a person who stays in a predetermined range from the person judged as the waiting person, as a waiting person.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

An example embodiment of the present disclosure will be described below with reference to the drawings. For clear descriptions, in the following descriptions and drawings, omission and simplification are performed when appropriate.

Figure 1:
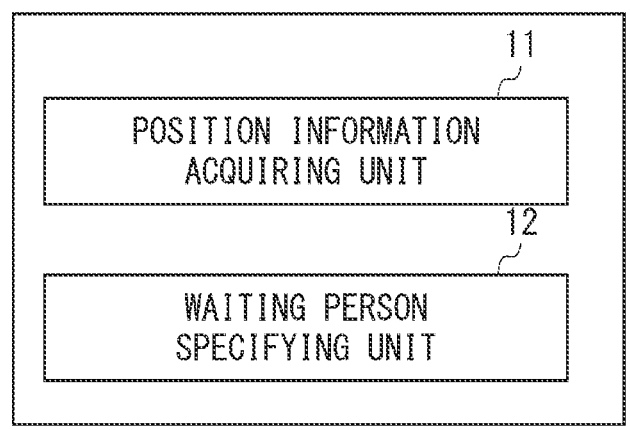
FIG. 1 is a block diagram showing an example of the configuration of a waiting situation managing device according to an example embodiment.

The example embodiment relates to a technology for knowing a waiting situation of users for a taxi, a bus or the like. FIG. 1 is a diagram showing, as functional blocks, an example of the configuration of a waiting situation managing device 10 according to the example embodiment. As shown in FIG. 1, the waiting situation managing device 10 includes a position information acquiring unit 11 and a waiting person specifying unit 12.

The position information acquiring unit 11 acquires position information about a person within a monitored area. The waiting person specifying unit 12 judges a person who stays in a waiting area within the monitored area, as a waiting person, and further judges a person who stays in a predetermined range from the person judged as the waiting person, as a waiting person. In this way, the person who stays in the predetermined range from the person who stays in the waiting area is collectively judged as the waiting person, and therefore, it is possible to more accurately know waiting persons.

Figure 2:
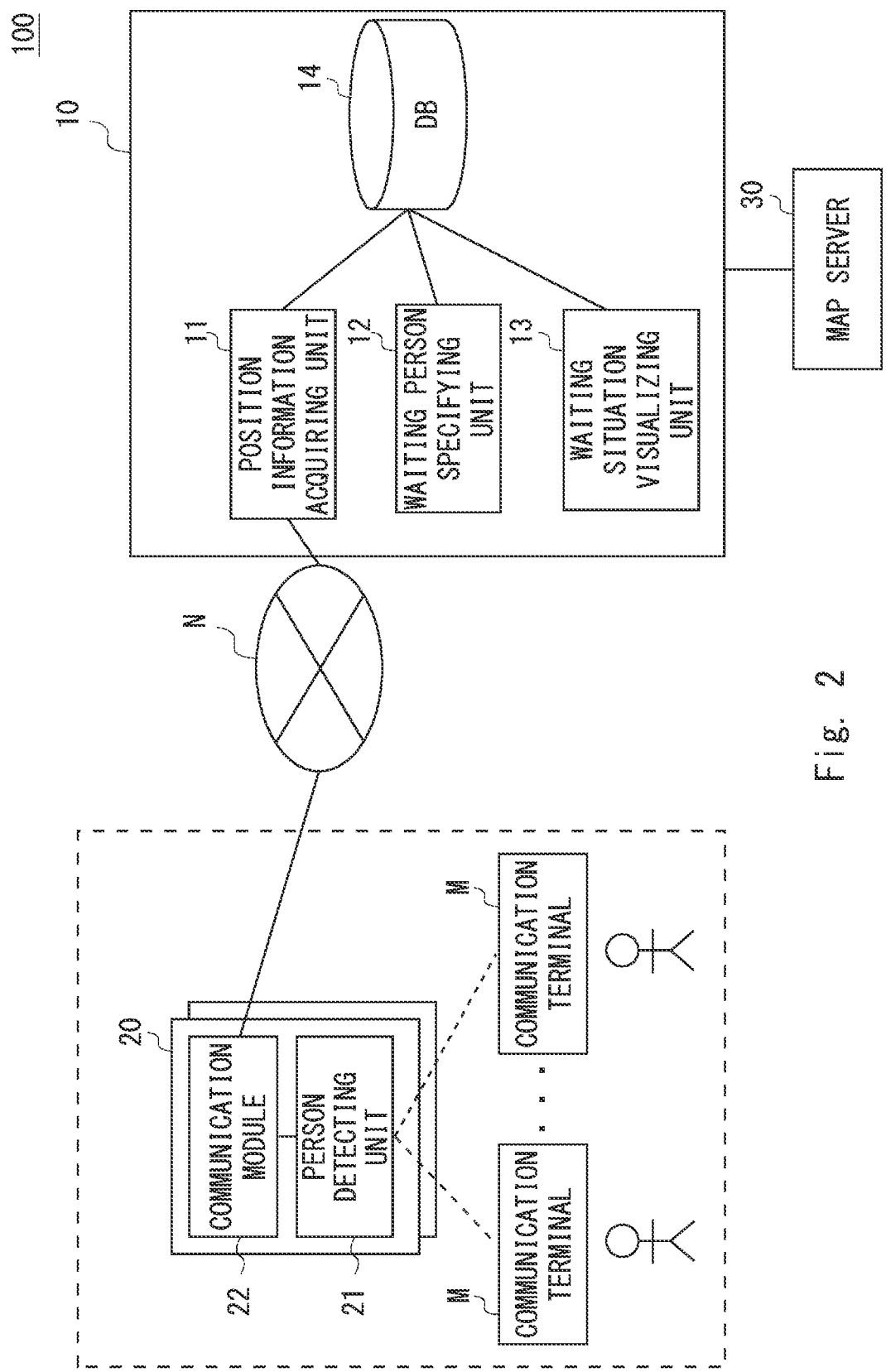
FIG. 2 is a block diagram showing an example of the configuration of a waiting situation managing system according to the example embodiment.

Next, a specific example of a waiting situation managing system 100 will be described with reference to FIG. 2. FIG. 2 is a diagram showing an example of the configuration of the waiting situation managing system 100 according to the example embodiment. The waiting situation managing system 100 includes the waiting situation managing device 10, a detection device 20 and a map server 30. Here, the waiting area is a stand for a taxi or a bus. The waiting situation managing system 100 visualizes the waiting situation of users, by distinctively displaying persons (waiting persons) who wait in a line for using a taxi or the like within a predetermined monitored area containing the waiting area and the other persons, on a map.

The detection device 20 is installed at a plurality of spots within the monitored area (for example, a traffic circle in front of a station and a pedestrian area adjacent to the traffic circle) and in the vicinity (for example, a display board at taxi or bus stand). The detection device 20 includes a person detecting unit 21 and a communication module 22. The person detecting unit 21 is installed within the monitored area, and detects position data that is received from a communication terminal M such as a smartphone carried by a person and that indicates the current position of the person.

As the person detecting unit 21, there is used a unit that measures the position of the person within the monitored area on two-dimensional coordinate axes such as latitude and longitude, or the like. As an example of the terminal positioning method, there is known a method in which the position of a communication terminal is specified by measuring electric field intensities of electric waves transmitted from a plurality of fixed and installed beacons with the terminal or measuring an electric field intensity of an electric wave transmitted from the terminal with a plurality of fixed and installed sensors, and performing comparison with an electric field intensity map (Shinichiro Mori, Sumatohonmuke Okunaisokuigijyutu No Doukou To Singijyutu No Shyoukai (In Japanese) (Trend of Indoor Positioning Technology for Smartphone and Introduction of New Technology), Information Processing, Vol. 53, No. 4, 2012). For example, the person detecting unit 21 detects a Wi-Fi electric wave sent from the communication terminal carried by the person, to acquire the position data about the communication terminal.

In addition, as a method for acquiring the position data by the person detecting unit 21, any method for specifying the position of the person within the monitored area, for example, a method of specifying the position of the person by the analysis of an image photographed by a fixed and installed camera, can be used. Further, the person detecting unit 21 issues the measured position data about the person and an ID for identifying the person. The communication module 22 sends the position data detected by the person detecting unit 21 and the ID to the waiting situation managing device 10 through a communication network N for LTE, 5G, LoRaWAN or the like, periodically (for example, every 5 seconds).

The waiting situation managing device 10 is communicably connected with the detection device 20. The waiting situation managing device 10 further includes a waiting situation visualizing unit 13 and a database 14, in addition to the position information acquiring unit 11 and the waiting person specifying unit 12 described in FIG. 1. The position information acquiring unit 11 acquires the position information about the person within the monitored area, based on the position data, and stores the content in the database (DB) 14.

The waiting person specifying unit 12 judges a person who stays in a waiting area (for example, in a circle with radius 2 m around the taxi stand), as a waiting person who waits in the area for using the taxi or the like. Here, a person whose movement distance within a predetermined time is in a predetermined range, for example, a person who has not moved for the last 30 seconds or more, can be regarded as the person who stays. Further, the waiting person specifying unit 12 judges a person who stays in the vicinity (for example, within 2 m) of the waiting person, as another waiting person. By repeating this process, it is possible to judge all persons who wait, as the waiting person. The waiting person specifying unit 12 stores, in the database 14, judgement results about persons who are of the persons within the monitored area stored in the database 14 and who are judged as the waiting person.

The waiting situation visualizing unit 13 acquires map information about the monitored area from the map server 30, and superimposes and displays the situation of the waiting persons specified by the waiting person specifying unit 12, on a map indicated by the map information. Thereby, it is possible to visualize the waiting situation of users. Further, the waiting situation visualizing unit 13 can display the waiting persons and persons other than the waiting persons within the monitored area, in a distinguishable manner.

Figure 3:
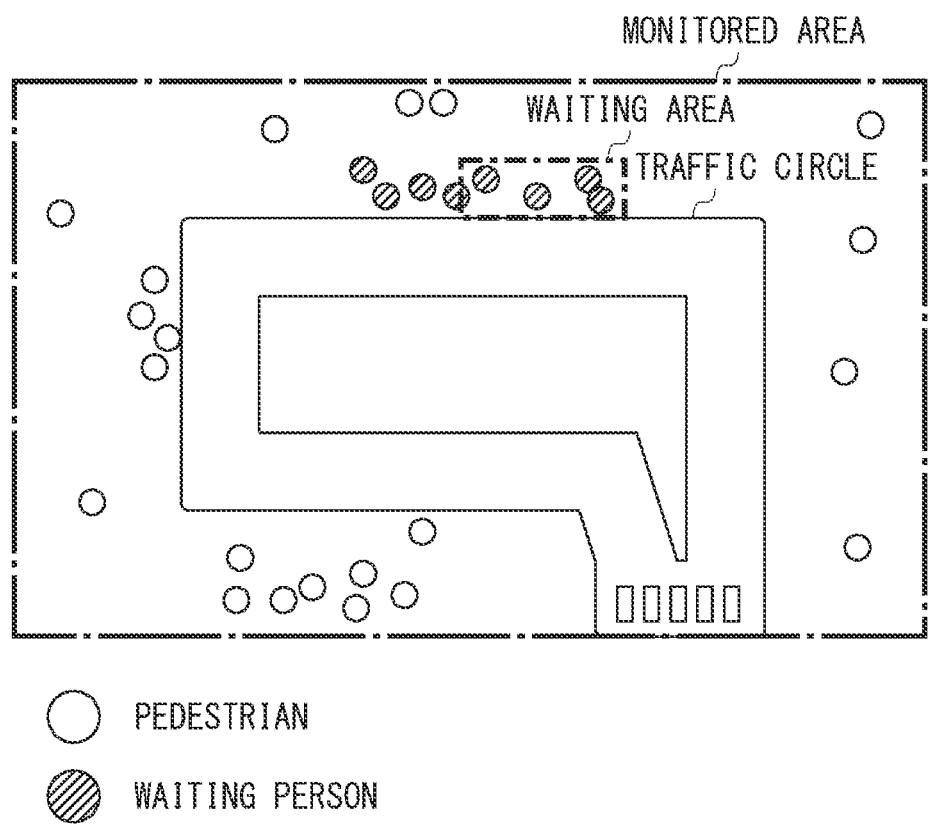
FIG. 3 is a diagram showing a waiting situation of users in a monitored area.
Figure 4:
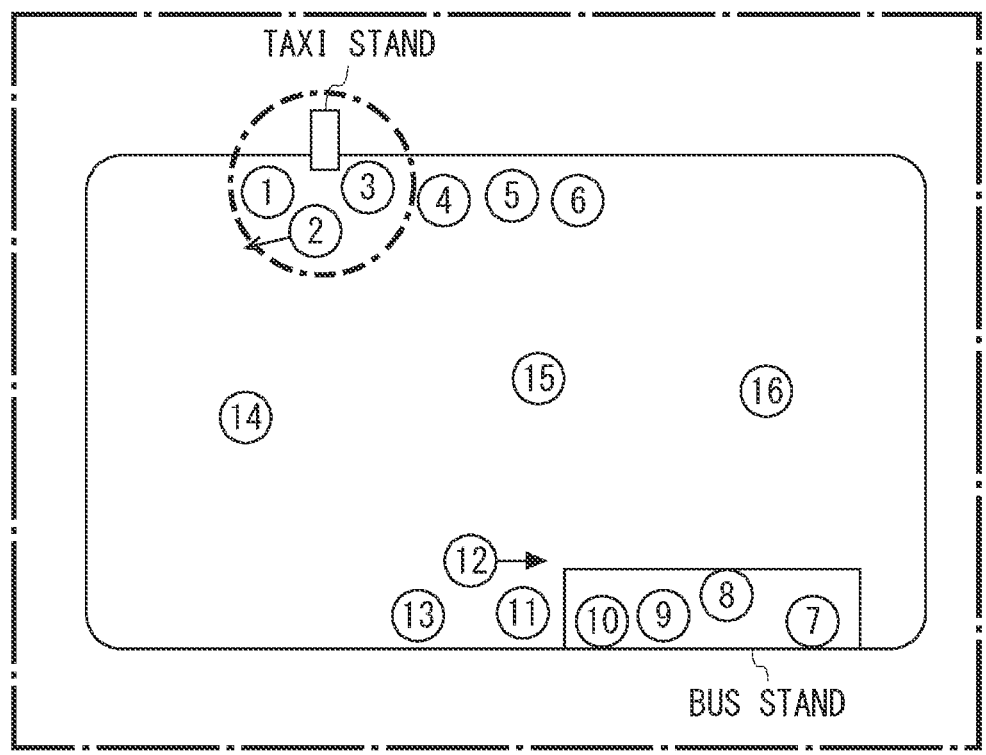
FIG. 4 is a diagram for describing a procedure of visualization of the waiting situation of users.

FIG. 3 is a diagram showing the waiting situation of users in the monitored area that is an output result from the waiting situation managing system 100. FIG. 3 shows a distribution situation of persons including waiting persons. In FIG. 3, each of hatched circles with oblique lines (with a mark) indicates the waiting person, and each of white circles (with no mark) indicates a person (hereinafter referred to as a pedestrian) who is not the waiting person. Further, the waiting area within the monitored area is indicated by a chain line rectangle.

The waiting situation managing system 100 is used by a taxi company, for example. The taxi company that uses the waiting situation managing system 100 can designate the waiting area on the map corresponding to the monitored area. As described above, the waiting situation managing device 10 judges whether persons who are in the designated waiting area and the vicinity of the waiting area are waiting persons, and displays persons judged as waiting persons, by circles with the mark.

The taxi company can monitor the waiting situation of users in real time, and therewith can decide the dispatch to a stand where waiting persons who wait for taxis are. Here, the dispatch may be decided by a human, or may be decided by an automated dispatch managing system.

An example of a procedure of the visualization of the waiting situation of users will be described with use of FIGS. 4 to 8. Each of FIGS. 4 to 8 illustrates the whole monitored area that is stored in the waiting situation managing system 100 and that contains a traffic circle in front of a station, and taxi and bus stands (waiting areas). For convenience of description, labels of 1 to 16 are put in circles indicating persons.

(Step 1)

First, a plurality of Wi-Fi sensors (not illustrated) installed within the monitored area detects the communication terminal M that is carried by a person and in which Wi-Fi is in the ON state, and acquires the position data. At this time point, the detected person has no distinction between the waiting person and the pedestrian.

The subsequent steps show an operation example for visualizing the waiting situation of users when the waiting area is a circle around a display board at the taxi stand.

(Step 2)

Figure 5:
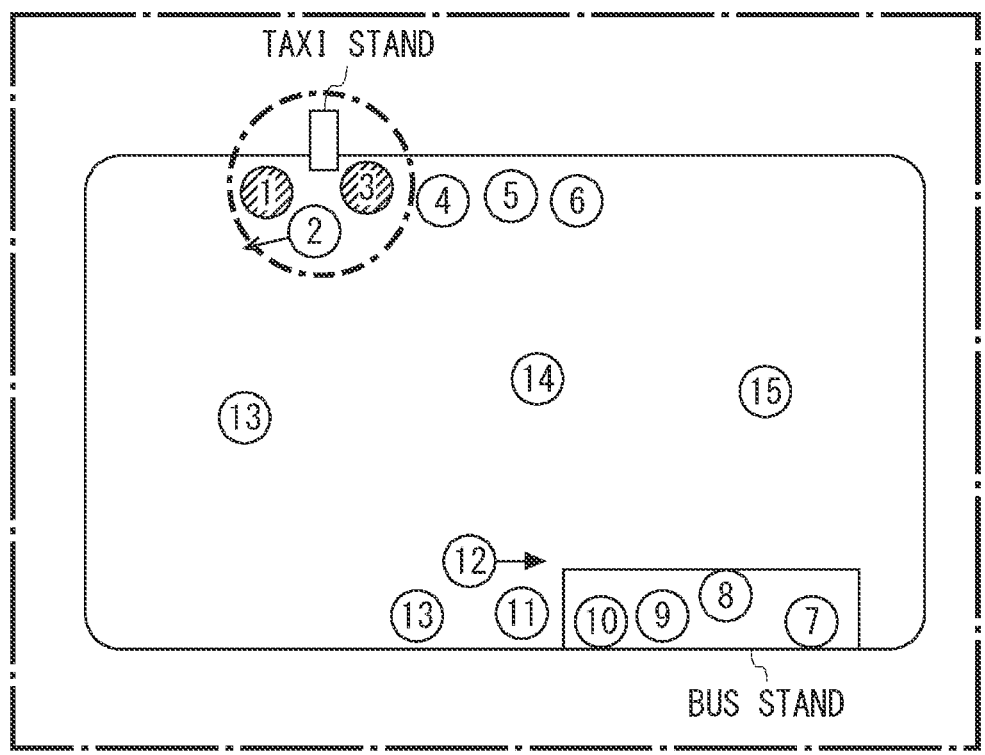
FIG. 5 is a diagram for describing the procedure of the visualization of the waiting situation of users.

The waiting person specifying unit 12 judges a person who stays in the waiting area (the taxi stand in this example), as the waiting person, and puts a mark such that the person can be identified (FIG. 5).

The person who stays and the person who is moving are distinguished based on the following criteria.

A person whose movement distance in the last defined time (for example, 30 seconds) is in a defined range (for example, within 1 m) is regarded as the waiting person who stays.

The other persons are regarded as moving pedestrians.

In the example of FIG. 5, among persons 1 to 3 in the waiting area, the persons 1, 3 are waiting persons who stay, and the mark is put to the waiting persons. On the other hand, the person 2 is moving although the person 2 is in the waiting area, and therefore, the mark is not put.

(Step 3)

Figure 6:
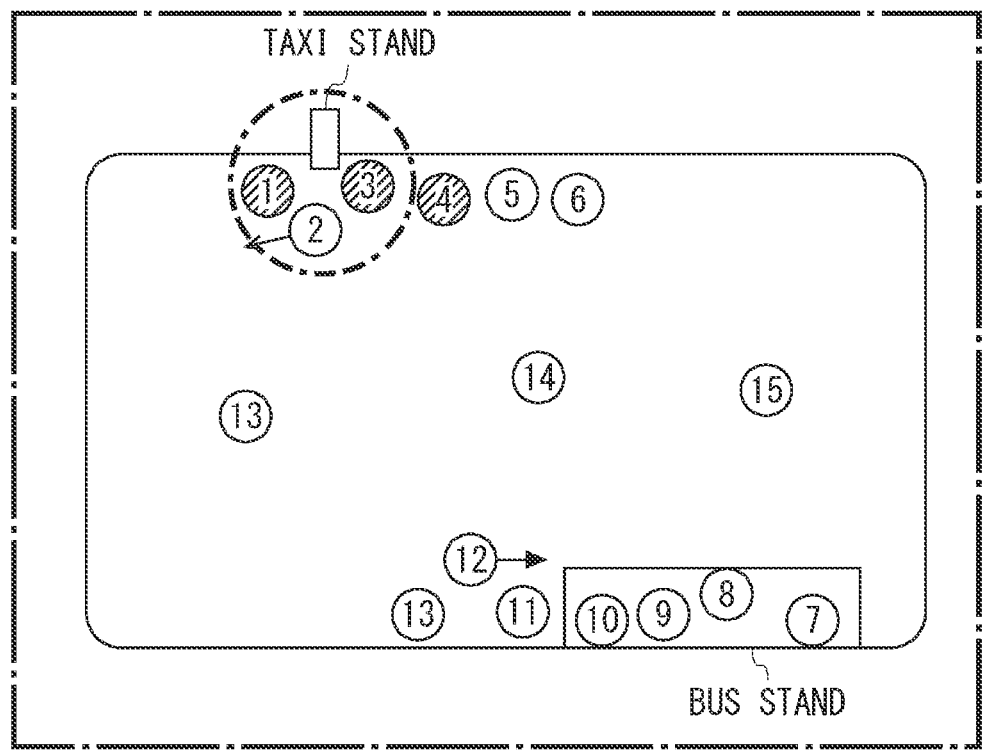
FIG. 6 is a diagram for describing the procedure of the visualization of the waiting situation of users.

Then, the mark is put to a person who stays in the vicinity (for example, within 2 m) of the marked waiting person. In the example of FIG. 6, the mark is put to a person 4 in the vicinity of the marked person 3 judged as the waiting person in step 2. In the case where a plurality of persons satisfies the condition, all persons are judged as the waiting person, and the mark is put.

(Step 4)

Figure 7:
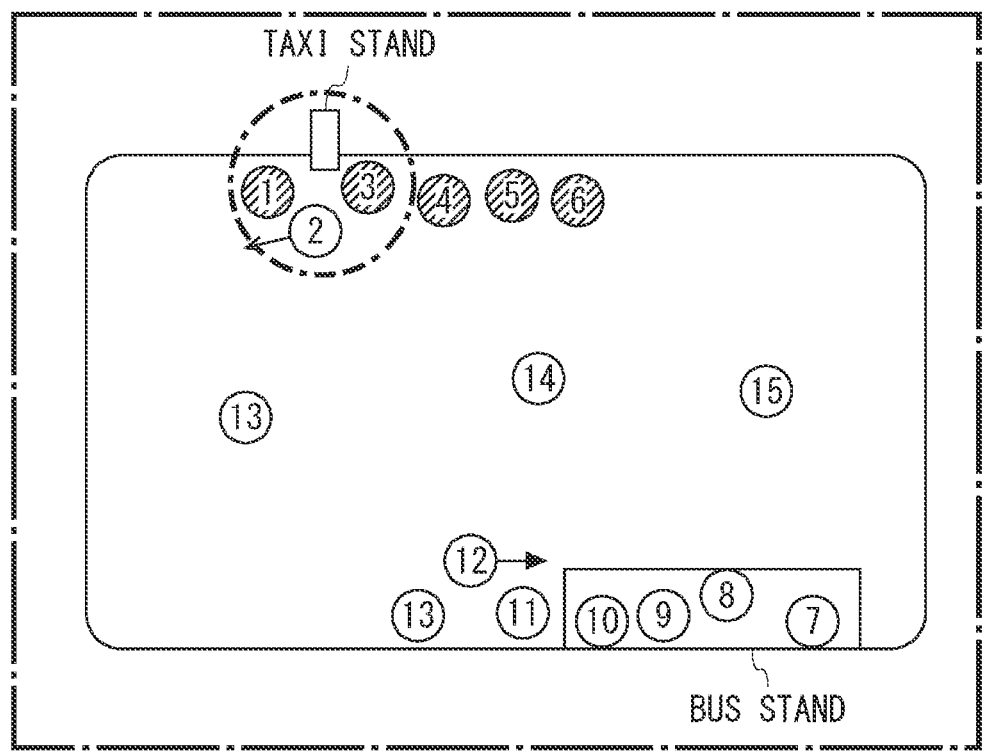
FIG. 7 is a diagram for describing the procedure of the visualization of the waiting situation of users.

The same process as that in step 3 is repeated until the person who stays in the predetermined range from the person judged as the waiting person is not found and there is no person to which the mark is newly put. In the example of FIG. 7, persons 1, 3, 4, 5, 6 are judged as the waiting person. After the mark is put to the persons, the process ends because there is no person to be marked any more.

(Step 5)

Figure 8:
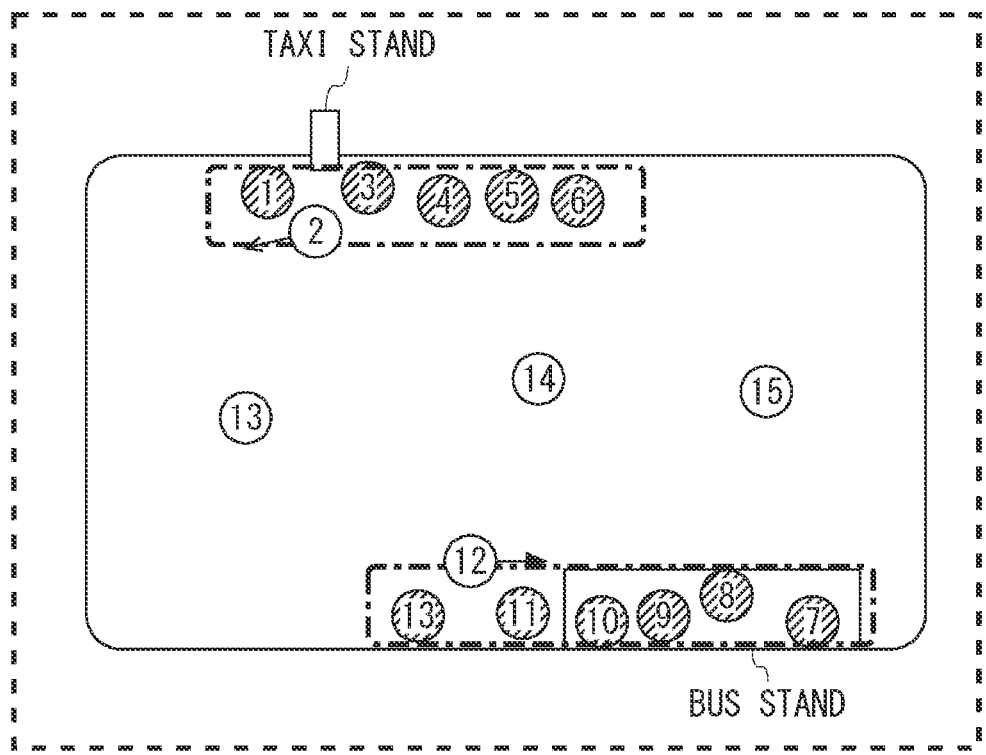
FIG. 8 is a diagram for describing the procedure of the visualization of the waiting situation of users.

Thereafter, a group of the waiting person to which the mark has been put until step 4 is displayed as waiting persons who wait in the waiting area (the taxi stand), such that the waiting persons can be distinguished from pedestrians. In this way, the waiting situation managing system 100 according to the example embodiment sets the person who stays in the vicinity of the stand for the taxi, the bus or the like, as a starting point, and recursively judges the person who stays near the starting point, as the waiting person, and thereby it is possible to exactly know persons who intend to use the taxi. Further, by setting the bus stand as the waiting area and performing the same processes as those in steps 2 to 5, it is possible to display the waiting situation of users at the bus stand, in addition to the taxi stand, as shown in FIG. 8.

As described above, the waiting situation managing system 100 according to the example embodiment can display, on the map, all waiting persons who wait at the stand for using the taxi, and makes it possible to more accurately know the waiting situation of users. The waiting situation managing system according to the example embodiment can be applied to a taxi dispatch system, a bus operation situation monitoring system, or the like.

A specific hardware configuration of the waiting situation managing system 100 according to the example embodiment is not limited to a particular configuration, and there are many variations. For example, the device according to the present disclosure may be realized using software, and the device may be configured such that various processes are divided, using a plurality of hardware. The constituent elements may be configured by a single circuit (processor or the like), or may be configured by a combination of a plurality of circuits. Here, the circuit (circuitry) may be a dedicated circuit, or may be a general-purpose circuit.

A program according to the example embodiment only needs to be a program that causes a computer to execute the above-described processes. In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure is not limited to the above example embodiment, and can be modified when appropriate, without departing from the spirit. The visualization result of the waiting situation that is obtained by the waiting situation managing system 100 may be provided to a third party. For example, a railway company with the waiting situation managing system 100 according to the example embodiment may acquire the waiting situation about taxi and bus stands in front of a station. Then, the railway company may provide the waiting situation about the taxi stand to a taxi company, and may provide the waiting situation about the bus stand to a bus company. Further, the technology in the present disclosure is not limited to the management service for the waiting situation of users for the taxi or the like, and for example, can be applied to a service that makes it possible to check line information about a popular restaurant or the like before going to the restaurant or the like.

According to the present disclosure, it is possible to know the waiting situation of users more accurately.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A waiting situation managing device comprising:
one or more processors; and
a memory storing program code executable by the one or more processors to:
acquire position information about a first person within a monitored area;
monitor the first person when the first person is within a waiting area within the monitored area, and to monitor a second person who is within a predetermined range of the first person,
wherein both the first person and the second person are specified as people who are waiting; and
continuously monitor a third person who is within the predetermined range of the first person or the second person, and specifying the third person as one of the people who are waiting until the third person is not found within the predetermined range of the first person or the second person.

2. The waiting situation managing device according to claim 1, wherein the predetermined range is a first predetermined range, and the program code is executable by the one or more processors to specify the second person as a person whose movement distance within a predetermined time is within a second predetermined range, as one of the people who are waiting.

3. The waiting situation managing device according to claim 2, wherein the program code is executable by the one or more processors to:
identify a pedestrian who moves as a person whose movement distance within a predetermined time is out of a predetermined range; and
specify the pedestrian as not being one of the people who are waiting.

4. The waiting situation managing device according to claim 1, wherein the program code is executable by the processors to acquire map information about the monitored area, and to display an indication of the people who are waiting on a map indicated by the map information.

5. The waiting situation managing device according to claim 4, wherein the program code is executable by the processors to display the first and second persons and a fourth person within the monitored area but who is not one of the people who are waiting person, in a distinguishable manner.

6. A waiting situation managing system comprising:
a detection device configured to detect position data that is received from a communication terminal, the detection device being installed within a monitored area, the communication terminal being carried by a first person, the position data indicating a current position of the first person,
a waiting situation managing device communicatively connected with the detection device and comprising one or more processors and a memory storing program code executable by the one or more processors to:
acquire position information about the first person within the monitored area, based on the position data;
monitor the first person who is within a waiting area within the monitored area, and to monitor a second person who is within a predetermined range of the first person;
wherein the waiting person specifying unit specifies both the first person and the second person as people who are waiting; and
continuously monitor a third person who is within the predetermined range of the first person or the second person, and specifying the third person as one of the people who are waiting until the third person is not found within the predetermined range of the first person or the second person.

7. A waiting situation managing method comprising:
acquiring position information about a first person within a monitored area;
monitoring a first person who is within a waiting area within the monitored area;
monitoring a second person who is within a predetermined range of the first person;
specifying both the first person and the second person as people who are waiting; and
continuously monitoring a third person who is within the predetermined range of the first person or the second person, and specifying the third person as one of the people who are waiting until the third person is not found within the predetermined range of the first person or the second person.

8. A non-transitory computer readable medium storing a program that causes a computer to execute a process comprising:
acquiring position information about a first person within a monitored area;
monitoring a first person who is within a waiting area within the monitored area;
monitoring a second person who is within a predetermined range of the first person;
specifying both the first person and the second person as people who are waiting; and
continuously monitoring a third person who is within the predetermined range of the first person or the second person, and specifying the third person as one of the people who are waiting until the third person is not found within the predetermined range of the first person or the second person.

* * * * *